(12) United States Patent
Luo et al.

(10) Patent No.: US 7,860,320 B2
(45) Date of Patent: *Dec. 28, 2010

(54) CLASSIFYING IMAGE REGIONS BASED ON PICTURE LOCATION

(75) Inventors: Jiebo Luo, Pittsford, NY (US); Andrew C. Gallagher, Pittsburgh, PA (US)

(73) Assignee: Eastman Kodak Company, Rochester, NY (US)

( * ) Notice: Subject to any disclaimer, the term of this patent is extended or adjusted under 35 U.S.C. 154(b) by 754 days.

This patent is subject to a terminal disclaimer.

(21) Appl. No.: 11/426,468

(22) Filed: Jun. 26, 2006

(65) Prior Publication Data

US 2007/0297683 A1 Dec. 27, 2007

(51) Int. Cl.
*G06K 9/70* (2006.01)
(52) U.S. Cl. ...................................... 382/227
(58) Field of Classification Search ................. 382/224, 382/109, 180, 173, 190; 354/106, 76; 701/207; 358/109, 107
See application file for complete search history.

(56) References Cited

U.S. PATENT DOCUMENTS

| | | | |
|---|---|---|---|
| 5,247,356 A | 9/1993 | Ciampa | |
| 5,506,644 A | 4/1996 | Suzuki et al. | |
| 5,754,676 A * | 5/1998 | Komiya et al. | 382/132 |
| 6,504,571 B1 * | 1/2003 | Narayanaswami et al. | 348/231.99 |
| 6,813,395 B1 * | 11/2004 | Kinjo | 382/305 |
| 7,092,573 B2 * | 8/2006 | Luo et al. | 382/228 |
| 2005/0105775 A1 * | 5/2005 | Luo et al. | 382/115 |
| 2005/0147298 A1 * | 7/2005 | Gallagher et al. | 382/173 |
| 2007/0027591 A1 * | 2/2007 | Goldenberg et al. | 701/23 |
| 2007/0183497 A1 * | 8/2007 | Luo et al. | 375/240.12 |

FOREIGN PATENT DOCUMENTS

| | | |
|---|---|---|
| EP | 1 519 568 | 3/2005 |
| WO | WO 03/094545 | 11/2003 |

OTHER PUBLICATIONS

Boutell, Matthew R, et al., Learning multi-label scene classification, Mar. 4, 2004, Pattern Recognition, 37 (2004) 1757-1771.*
Luo, Jiebo et al., Self-supervised texture segmentation using complementary types of features, Aug. 28, 2000, Pattern Recognition, 34 (2001) 2071-2082.*
Luo, Jiebo et al., A Bayesian network-baseedd framework for semantic image understanding, Aug. 9, 2004, Pattern Recognition, 38 (2005) 919-934.*

(Continued)

*Primary Examiner*—Bhavesh M Mehta
*Assistant Examiner*—Tahmina Ansari
(74) *Attorney, Agent, or Firm*—Raymond L. Owens (57) ABSTRACT

A method of classifying regions in a digital image or video captured by an image capture device includes providing a geographic location determining device associated with the image capture device; using the location determining device to measure the image capture location at substantially the time that the digital image or video was captured; and classifying regions in the captured digital image or video into one or more classes based on the image-capture location.

16 Claims, 5 Drawing Sheets

OTHER PUBLICATIONS

Benz et al., ("Multi-resolution, object-oriented fuzzy analysis of remote sensing data for GIS-ready information", Definiens Imaging GmbH, Trappentreustr. 1, D-80339, pp. 239-258, Munich, Germany, Available online Dec. 16, 2003, http://www.sciencedirect.com/science?_ob=ArticleURL&_udi=B6VF4-4B7N7T9-1&_user=2502287&_rdoc=1&_fmt=&_orig=search&_s.*

Zipf Alexander, "User-adaptive maps for location-based services (LBS) for tourism", Information and Communication Technologies in Tourism 2002, Proceedings of the International Conference in Innsbruck, Austria, 2002, Wöber, Karl W.; Frew, Andrex J.; Hitz, Martin (Eds.), 2002, XIII, 526 p. 108 illus., Softcover, ISBN: 978-3-211-83780-1.*

Iwerks et al., "Visualization of dynamic spatial data and query results over time in a GIS using animation", Visual Information and Information Systems—Visual'00, Lyon, France, Nov. 2000, 166-177, http://www.cs.umd.edu/~hjs/pubs.html.*

Cox et al., "Chapter 4.4: Use of Geographic Information Systems and Spatial Analysis in Area-Wide Integrated Pest Management Programmes that Integrate the Sterile Insect Technique", Sterile Insect Technique, Publisher Springer Netherlands, DOI 10.1007/1-4020-4051-2, Copyright 2005, ISBN 978-1-4020-4050-4 (Print) 978-1-4020-4051-1, pp. 453-477.*

"From Context to Content: Leveraging Context to Infer Media Metadata", by Marc Davis et al., ACM Multimedia, Proceedings of the International Conference, New York, NY, XP002374239.

"Probabilistic Spatial Context Models for Scene Content Understanding" by Amit Singhal et al., Proceedinkgs 2003 IEEE Conference on Computer Vision and Pattern Recognition CVPR 2003. XP010644903.

* cited by examiner

CLASSIFYING IMAGE REGIONS BASED ON PICTURE LOCATION

CROSS REFERENCE TO RELATED APPLICATIONS

Reference is made to commonly assigned U.S. patent application Ser. No. 10/747,597, filed Dec. 29, 2003, entitled "Detection of Sky in Digital Color Images" by Gallagher et al, U.S. patent application Ser. No. 10/712,181, filed Nov. 13, 2003, entitled "Method of Using Temporal Context for Image Classification" by Luo et al, and U.S. patent application Ser. No. 10/016,601, filed Dec. 10, 2001, entitled "Method and system for selectively applying enhancement to an image" by Luo et al, the disclosures of which are incorporated herein.

FIELD OF INVENTION

The field of the invention relates to digital image capture devices and classifying image regions based on recorded picture-taking location information.

BACKGROUND OF THE INVENTION

One fundamental task in image understanding is to computationally determine the likelihood that regions (a connected group of pixel positions) or pixels of an image represent a specific material, also referred to as region classification or region labeling. This can be quite difficult, especially when the computer lacks the contextual information about the image. Current techniques use features derived from the image to generate belief maps (e.g. above cited, commonly-assigned U.S. patent application Ser. No. 10/747, 597 in the case of sky detection). For example, a white region in an image may or may not represent snow. Such techniques often produce incorrect results in that it is difficult to produce features that can be used for robust classification, primarily because many materials share similar color and texture characteristics (e.g., snow and cloud).

In a related task, sometimes it is necessary to classify an entire image into one of the known categories. For example, in many cases it is useful to classify a digital image as either an outdoor image or an indoor image. Performing this task by using the image data alone is also quite difficult and prone to errors.

In U.S. Pat. No. 6,504,571, images have associated geographic capture information. Queries are converted to latitude and longitude queries. For example, a search for images captured on beaches causes the system to display a list of beaches. Places such as stadiums, parks or lakes are processed in a similar manner. While this method does provide utility for finding images captured at specific places, it does not help determine the content, i.e., region labeling, within the images themselves. For example, the system would not distinguish an image captured inside a house on a beach from an image, captured at the same place, of the ocean. Furthermore, other systems describing location information associated with images such as U.S. Pat. Nos. 5,506,644 and 5,247,356 similarly do not help in determining the content of the image or the materials represented within the image. For example, the system would not locate houses or sand within the image.

There is therefore a need to design a method for classifying regions of specific materials and objects in a digital image while exploiting the geographic location information captured along with the image.

SUMMARY OF THE INVENTION

It is an object of the present invention to facilitate classifying regions of digital images, captured by a digital image capture device, using captured geographic location information.

This object is achieved by a method of classifying regions in a digital image or video captured by an image capture device, including providing a geographic location determining device associated with the image capture device, using the location determining device to measure the image capture location at substantially the time that the digital image or video was captured, and classifying regions in the captured digital image or video into one or more classes based on the image capture location.

DETAILED DESCRIPTION OF THE INVENTION

Figure 1:
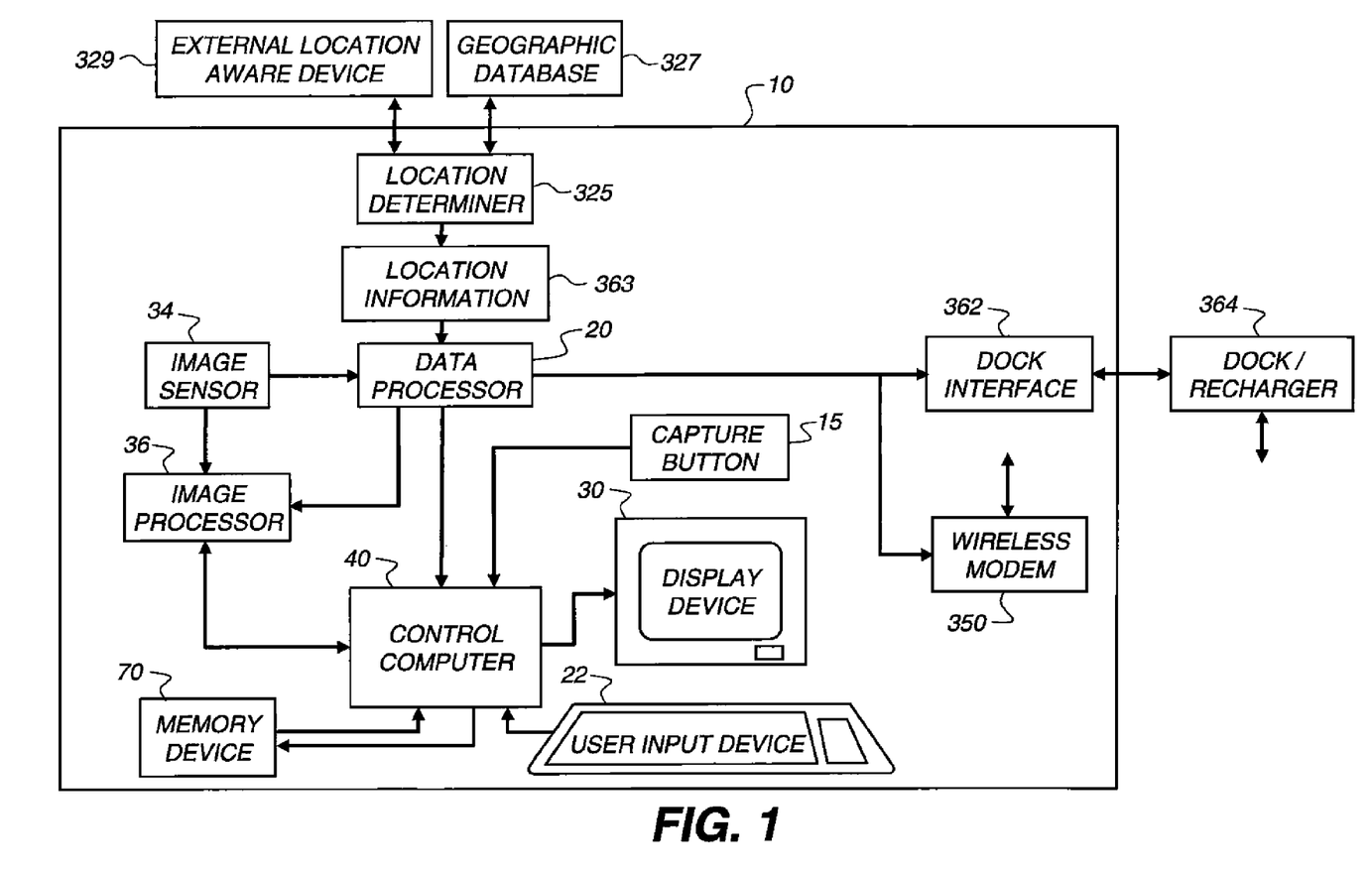
FIG. 1 is a block diagram representing a digital image capture device that can practice the present invention.

FIG. 1 shows the prior art digital image capture device 10 such as a digital camera, a digital video camera, or a camera phone. The image capture device includes user inputs 22. As shown, the user inputs 22 are buttons, but the user inputs 22 could also be for example a joystick or touch screen. The user commands the operation of the image capture device 10 through user inputs 22, for example by selecting a mode of operation of the image capture device 10. The image capture device 10 also includes a display 30 upon which the user can preview images captured by the image capture device 10 when the capture button 15 is depressed. The display 30 is also used with the user inputs 22 so that the user can navigate through menus. The display 30 can be, for example, a liquid crystal display (LCD) or organic light emitting diode (OLED) screen, as are commonly used on digital image capture devices. The menus allow the user to select the preferences for the image capture device's operation. The image capture device can capture either still images or images in rapid succession such as a video stream.

The general control computer 40 shown in FIG. 1 stores the present invention as a computer program in a computer readable storage medium, which may comprise, for example: magnetic storage media such as a magnetic disk (such as a floppy disk) or magnetic tape; optical storage media such as an optical disc, optical tape, or machine readable bar code; or solid state electronic storage devices such as random access memory (RAM), or read only memory (ROM). The associated computer program implementation of the present invention may also be stored on any other physical device or medium employed to store a computer program indicated by memory device 70. The control computer 40 is responsible for controlling the transfer of data between components of the image capture device 10. For example, the control computer 40 determines that the capture button 15 is depressed by the user and initiates the capturing of an image by the image sensor 34.

The image processor 36 is used to process digital images to make adjustments for overall brightness, tone scale, or image structure of digital images in a manner such that a pleasing looking image is produced by an image display device 30.

Those skilled in the art will recognize that the present invention is not limited to just these mentioned image processing functions.

The data processor 20 is used to process image information from the digital image as well as location information 363 from the geographic location determiner 325 to generate metadata for the image processor 36 or for the control computer 40. The operation of the data processor 20 will be described in greater detail below.

It should also be noted that the present invention can be implemented in a combination of software or hardware and is not limited to devices that are physically connected or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the image capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for the digital image processing steps described below, replacing original pixel values with processed pixel values is functionally equivalent to generating a new digital image with the processed pixel values while retaining the original pixel values.

The image capture device 10 includes a location determiner 325. This location determiner 325, or geographic location determining device, includes a location information receiver that receives location information 363. The location information 363 is then stored in association with the images. The location information 363 is preferably stored as coordinates that are directly readable on the map that will be used; for example, a geographic map location is generally conveniently stored in units of latitude and longitude. The converter can include a conversion geographic database 327 that relates different ways of representing locations. For example, place-names (e.g. Aunt Dora's house), latitude and longitude, and street addresses are related. The conversion geographic database 327 can be located on the image capture device itself, or external to the image capture device with remote access via a network interface such as a dock interface 362 or wireless modem 350. The dock interface can be connected to a dock recharger 364. The location determiner 325 can additionally or alternatively include input from a user interface 22, such as a microphone or keyboard, that allows the user to input map locations or location information 363.

The location information 363 can define exact locations (within applicable tolerances) determined at the time of image capture, but if that information is not available, locations can be assigned based upon the best available data (discussed below). Tolerances of locations associated with a collection of capture records can all be the same or can vary. Acceptable tolerances and mixtures of different tolerance ranges can be determined heuristically for a particular use.

Location information 363 can also define different sizes of physical location. For example, GPS coordinates define a small geographic area, while the geographic area defined by a telecommunication cell is relatively large, depending upon such factors as output or antenna configuration. User input location information can define a small area, such as an intersection of two streets or a larger area such as a city or county.

The location information 363 can be provided, at the time of capture, in the form of a data transmission. The data transmission is any transmission of information that identifies the location of the capture device or the captured subject at the time of capture. Types of data transmissions include: locally and remotely transmitted location coordinates, identifications of cell sites, wired and wireless network addresses, and remotely transmitted and user input identifications. GPS (Global Positioning System) coordinates are particularly convenient as particular coordinates identify a small geographic area.

The location information 363 determined by the location determiner 325 can be determined by any of a number of ways. For example, the geographic location may be determined by receiving communications from the well-known Global Positioning Satellites (GPS). Cellular telephones, in some jurisdictions, have GPS or other positioning data available, which can be used to provide map locations. Alternatively, location information 363 can be indicated by identifications of transmission towers and use of triangulation. Features of the transmission towers can be kept in a database, which can be consulted in determining location information 363 from received transmissions.

Network node information can be used to identify a map location. In this case, the location information 363 is supplied via a network interface, such as a dock interface 362 or a wireless modem 350. For example, the dock interface can use one of the IEEE 802.11 wireless interface protocols to connect to a wireless network. The location determiner can also use the MAC (Media Access Control) address of a wireless access point to provide location information that can be converted to a map location using a database relating MAC addresses to map locations. MAC addresses are permanently recorded in the hardware of wireless access point equipment. For example, the MAC address 48-3F-0A-91-00-BB can be associated with the location 43.15 degrees N, 77.62 degrees W. This approach rests upon an assumption that the map location in the database corresponds to the actual location of the equipment providing the MAC address. In a similar manner, a "traceroute" utility can be used that determines IP addresses (defined by the TCP/IP Protocol) of all routers from a client computer to a remote host that carry a particular message across the Internet to get an approximate idea of geographic location as described in U.S. Pat. No. 6,757,740 by Parekh et al., which is hereby incorporated herein by reference.

The map locations or location information 363 can additionally or alternatively be supplied by the user. For example, the user can input latitude and longitude information or postal zip code to define the geographic location associated with the image.

The location information 363 can be represented as a probability distribution rather than a single point. Even the most accurate location determination system (currently available) described above (GPS) is susceptible to errors of at least several meters. The geographic location can be represented as a point and an associated uncertainty, or as a probability distribution. For example, when the geographic location is a postal zip code, a uniform probability distribution over the region defined by the zip code can be used.

In other embodiments, the image capture device or other capture device has a location determiner 325 that receives and stores location information in association with captured images from the external location aware device 329 that is separate from the image capture device 10.

In that case, geographic locations are determined by the location aware device 329 and are then transmitted to the image capture device 10 via the dock interface 362 or the wireless modem 350. A location aware device 329 is a device that knows its location by means of a location information receiver, such as a GPS receiver built into an automobile, or is a stationary object that knows its position, such as a radio-frequency beacon. The location determiner 325 can either poll the external location aware device 329 for its location, or the location determiner 325 can poll the external location aware device 329 for its location at a specific time (for example, the specific time is an image capture time). This alternative is effective when the location aware device 329 is in close proximity to the image capture device 10, as for example when the location aware device 329 is a GPS receiver in an automobile that transmits a location signal to the image capture device.

In particular embodiments, the location determiner 325 estimates a map location of a capture record that would otherwise lack map locations. For example, GPS receivers often fail to detect signals when indoors. A location determiner 325 that includes such a receiver can use nearest in time available location information or an interpolation between multiple geographic positions at times before or after the image capture time. As an option, the digital processor can continuously store the geographic location determined by the location determiner 325, rather than storing only in temporal relation to image capture. This approach provides data for estimating locations when data transmissions are unavailable and has the added benefit of allowing the image capture device to display not only the locations of captured images, but also the path taken by the user between image captures.

The image capture device 10 determines a location information 363 L when an image or video is captured and associates the location information 363 L with the image or video.

When the image capture device 10 captures a video stream, there can be location information 363 L for each digital image of the video stream. Or there can be one location information 363 L for several frames of the video stream. There can also be several location information 363 vectors L for each frame of the video stream.

Internally, the image capture device 10 integrally includes a location determiner 325 for recording the picture-taking location information 363 at arbitrary times. The measured air characteristics are represented as a vector A. An ambient air sensor, (not shown) is capable of determining the characteristics of the ambient air surrounding the image capture device without the need for capturing an image. These air characteristics are associated with a digital image, and are used by the present invention to improve image noise characteristics, classify regions of an image according to the materials that these regions represent, classify images as indoor or outdoor, cluster related images into events, and search for specific images.

Figure 2:
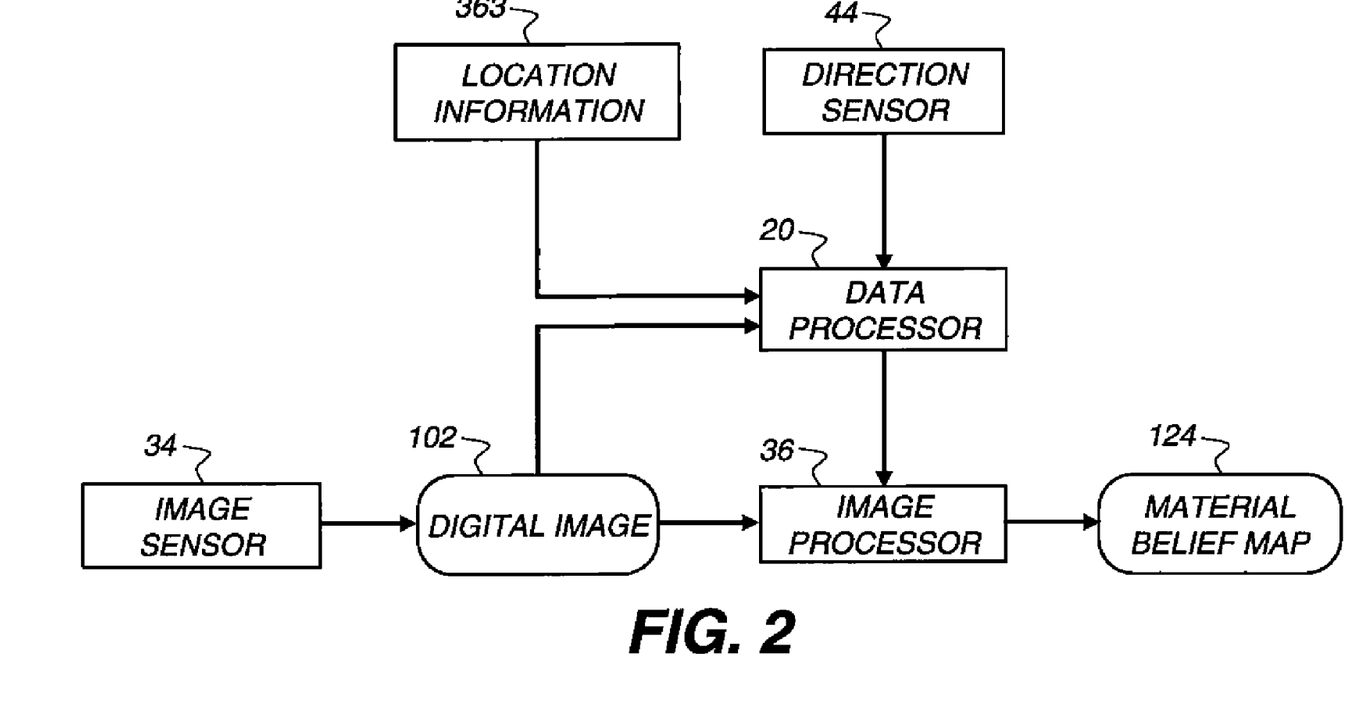
FIG. 2 is a block diagram representing the operation of the digital image capture device in FIG. 1 for producing a material belief map for a plurality of class labels.

Referring to FIG. 2, an additional direction sensor 44 integral with the image capture device 10 can optionally be used to determine the direction the image capture device points to with respect to the earth, i.e., camera-facing direction. The direction sensor 44 preferably determines inclination and compass orientation of the optical axis of the image capture device. In general, the location aware device 329 does not provide such direction information. This additional information can be useful when the environment is far from isotropic at a given geographic location, e.g., one would see mostly sky and ocean if he faces east on the Miami beach while he would see buildings and tress when facing west.

Referring again to FIG. 2, the image sensor 34 captures a digital image 102 and produces a raw image that is passed to an image processor 36. The image processor 36 prepares the raw image for viewing by interpolating missing pixel values from the image sensor 34, applying color correction matrices, rendering the image, and the like. Additionally, the data processor 20 analyzes the location information 363 and direction information from the direction sensor 44 and possibly the digital image 102 (or a partially corrected version of the digital image from the image processor 36) to produce a material belief map 124. The material belief map 124 is used to represent the labeling and the associated probability for each material region in the image. It is the outcome of image region classification and can be useful for a wide variety of applications, including image enhancement and image retrieval.

Figure 3:
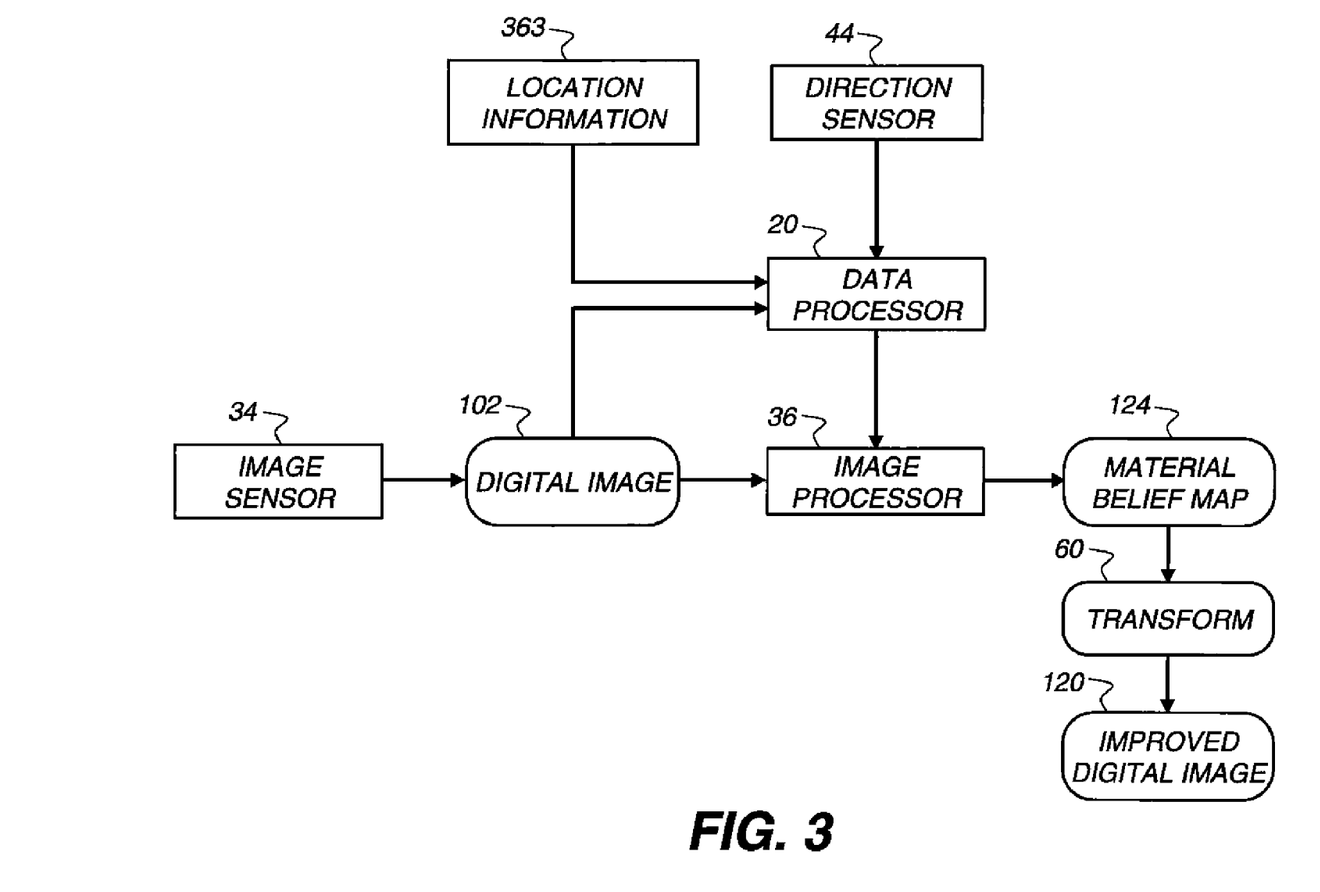
FIG. 3 is a block diagram representing the operation of using the output of digital image capture device in FIG. 2 to improve a digital image.

In FIG. 3, the material belief map is used to control a selected image transform 60 to create an enhanced or improved image 120. For example, heavier noise cleaning should be applied to the clear sky region while the grass region should be left alone to preserve the desired texture. More details on how to use this map in image enhancement and manipulation can be found in U.S. patent application Ser. No. 10/016,601, filed Dec. 10, 2001, entitled "Method and system for selectively applying enhancement to an image" by Luo et al. Those skilled in the art will recognize that the present invention is not limited to image enhancement described above and may include other image enhancement, manipulation, search, indexing, retrieval, and organization applications. For example, region classification can facilitate image search of a database by using the techniques described above, such as "finding images with blue sky" or "finding images with blue sky and green grass."

Metadata is information related to the image not including pixel data. The geographic location 363 of the image capture device 10 at the picture-taking time is an example of metadata. Several additional metadata items are also input to the data processor 20. The time and date of the capture of the digital image 102 and for instance other data related to the capture of the digital image such as exposure time (in seconds) and focal length $f_1$ (in pixels) at the time of image capture are included. In addition, metadata includes the current image capture device settings such as the status of menu items or operating modes as selected by the user. All such information associated with the digital image 102 can be stored as metadata associated with the digital image 102 and become useful in the subsequent image processing. The definitions of a few most useful materials, including sky, grass, open water, and snowfield, are given in Table 1 (shown below). Other materials will suggest themselves to those skilled in the art such as clouds, pavement, and walls. Details of classifying a material region can be found in commonly assigned U.S. Pat. No. 7,062,085, by Luo et al. The image processor 36 assigns class probabilities (also known as belief values) based on features computed for a region or pixel of the image 102 such as color, texture, shape, or location within the image and outputs the results in the form of the aforementioned belief map 124.

TABLE 1

Definitions of a Few Materials

| | |
|---|---|
| Sky: | sky, clouds, and haze, even if seen through a window or door |
| | Ideal blue sky: sky appears blue, no clouds are visible |
| | Gray (overcast) sky: sky is covered with clouds, no blue areas are visible |
| Grass: | mowed green grass growing on a lawn or field or other area where it is planted and cut |
| Water: | a body of open water, either flowing or still, that may have ripples or waves but is not frothy or white (due to rapids or a waterfall or crashing waves) |
| Snow/Ice field: | any area of fallen, uncovered snow or solid ice |

Figure 4:
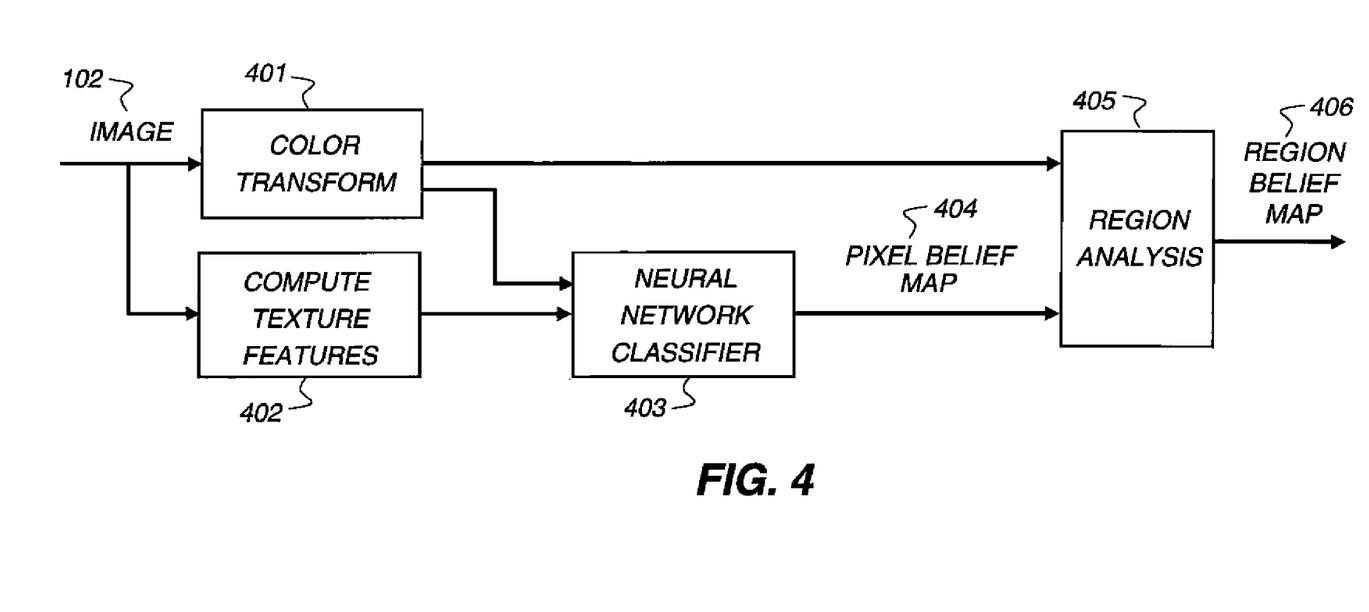
FIG. 4 is a block diagram representing the operation of classifying a region in a digital image.

In general, all of the material detectors (or region classifier or region labeler), which reside in the image processor 36, follow an approach similar to what is illustrated in FIG. 4. First, color features 401 and texture features 402 are extracted on a low-resolution, i.e., 256×384, version of the input image 102. Preferably, the computed features would be effective in differentiating the pixels of the concerned material from those of other material classes. The features are then fed to a classifier 403, such as a trained neural network, which produces a pixel belief map 404 associating class probability or belief value to each pixel in the image according to the color and texture characteristics of the materials. Next, a threshold is used to obtain spatially contiguous homogeneous regions from the pixel belief map. Finally, each spatially contiguous region is further analyzed 405 according to certain unique region-based characteristics of the concerned material class and the confirmed regions form the initial region belief map 406 where each region is associated with a uniform belief value. Details on region classifiers can be found in U.S. Pat. No. 7,062,085. In terms of the inference process, these methods use essentially bottom-up strategies because no context model is imposed.

Unfortunately, using only image features can result in ambiguous results. For example, suppose a region is light in intensity, very low in saturation and low in texture. The probability that the region represents snow is P(region=snow|features), where the features are for example the region's average intensity, saturation, and texture magnitude. However, even the most sophisticated classification system cannot accurately distinguish between classes when their distributions, e.g. P(features|region=snow) and P(features|region=white carpet) overlap.

A top-down strategy is needed to provide a regularization mechanism to reduce the amount of ambiguity and resulting misclassification associated with classifying material regions individually. Top-down inference can be facilitated by use of context information and can help discriminate between "confusing" material classes with similar color and texture. Context information can come from an overall description of the whole scene, i.e., scene context, or from the normal relationships among the location of different materials in the scene without knowing exactly what the scene type is, i.e., spatial context. In the case of scene context, knowledge of an outdoor or beach scene can impose strong constraints on what material classes may be present in the scene, and where these materials may be likely to occur in the scene. The constraints imposed by the use of spatial context are weaker than those imposed by the use of scene context, but are still sufficient, in many cases, to reduce the ambiguity among conflicting material detectors and eliminate improbable spatial configurations in material detection. Its advantage is that it does not depend on knowing the exact scene type. On the other hand, if more information about the scene is known, e.g., picture-taking location in this case, the context model can be enriched to provide stronger constraints to material region classification. At least two types of spatial contextual relationships are present in natural images. First, relationships exist between co-occurrence of certain materials in natural images; for example, detection of grass with high probability would imply low snow probability. Second, relationships exist between spatial locations of materials in an image; sky tends to occur above grass, foliage above grass, or sky above snow.

In order to use spatial context to evaluate and adjust the material belief obtained from the low-level material detectors, the present invention relies on a graphical model to represent the spatial constraint information among all the regions in an image, and eventually generates new material belief values that represent the best compromise between the spatial constraints and the original material belief values.

In one embodiment of the present invention, the set of pair-wise spatial relationships include {above, far_above, below, far_below, beside, enclosed, and enclosing}. A threshold on the distance between the nearest pixels of two regions is used to discriminate between above and far above (likewise for below and far_below).

The spatial context models are built by learning probability density functions corresponding to the spatial relationships described above. From a database containing collected extensive ground truth for various material classes, a simple frequency counting approach suffices to generate discrete probability density functions for all the spatial relationships P(spatial relationship|location). Using the probability density function for the far above pair-wise relationship in Table 2 (shown below) as an example, one can make the following observations:

1. If a region is far above a sky region, it can only be another sky region, a foliage region, or a background (other class of) region;
2. If a region is far above a grass region, it is most likely to be a foliage or sky region;
3. If a region is far above a foliage region, it is most likely to be a sky region;
4. If a region is far above a snow region, it is most likely to be another snow or a sky region;
5. If a region is far above a background (other) region, it can be virtually any region with a sky region being the most likely.

TABLE 2

CPM for the relationship "far above" when location is unknown

| | A | | | | | |
|---|---|---|---|---|---|---|
| B | sky | grass | foliage | water | snow | background |
| sky | 0.87 | 0.00 | 0.10 | 0.00 | 0.00 | 0.03 |
| grass | 0.42 | 0.06 | 0.44 | 0.03 | 0.03 | 0.02 |
| foliage | 0.68 | 0.05 | 0.23 | 0.02 | 0.00 | 0.02 |
| water | 0.53 | 0.06 | 0.33 | 0.04 | 0.02 | 0.02 |
| snow | 0.50 | 0.04 | 0.03 | 0.02 | 0.39 | 0.02 |
| background | 0.41 | 0.09 | 0.21 | 0.12 | 0.15 | 0.02 |

Other probability density functions can be built and interpreted in a similar fashion. The probability density functions can be used to construct probabilistic graphical networks that describe the spatial relationships between all the regions in the image, and can be solved to account for the conditional probabilities associated with the spatial context models.

The advantage of the model in Table 2 is that this model is applicable to any location. However, it does not utilize geographic location information and essentially disregards location by assuming it is unknown. Table 3 (shown below) shows an example of a location-specific conditional probability model for Key West in USA. Most notable changes from the location-unaware model include:

1. If a region is far above a sky region, it is slightly more likely to be another sky region than a foliage region, or a background (other class of) region;
2. If a region is far above a grass region, it is slightly more likely to be a sky region than a foliage region, and it is also more likely to be a water region;
3. If a region is far above a water region, it is slightly more likely to be a sky region than a than a foliage region;
4. It is not applicable if a region is far above a snow region because it is nearly impossible to have a snow region to begin with;
5. If a region is far above a background (other) region, it is more likely to be a sky region or a water region and nearly impossible to be a snow region.

TABLE 3

CPM for the relationship "far_above" when location is known (Key West, USA)

| | A | | | | | |
|---|---|---|---|---|---|---|
| B | sky | grass | foliage | water | snow | background |
| sky | 0.90 | 0.00 | 0.05 | 0.00 | 0.00 | 0.05 |
| grass | 0.47 | 0.06 | 0.35 | 0.08 | 0.00 | 0.02 |
| foliage | 0.68 | 0.05 | 0.23 | 0.02 | 0.00 | 0.02 |
| water | 0.60 | 0.06 | 0.22 | 0.10 | 0.00 | 0.02 |
| snow | N/A | N/A | N/A | N/A | N/A | N/A |
| background | 0.48 | 0.09 | 0.21 | 0.20 | 0.00 | 0.02 |

Furthermore, the geographic location information also affects the prior probability of seeing certain material classes, i.e., P(material|location). Table 4 (shown below) shows the statistics of various material classes in consumer photos. In particular,
1. 31% of photos contain significant pieces of visible sky, and the likelihood is even higher at 55% for outdoor images;
2. 29% of all images and 52% of outdoor images contain grass;
3. 35% of all images and 65% of outdoor images contain foliage;
4. 10% of all images and 19% of outdoor images contain open water;
5. 2.4% of all images and 4.5% of outdoor images contain snow cover.

TABLE 4

The probabilities of materials when location is unknown.

| Material | % of all pixels | % of all images | % of indoor images | % of outdoor images |
|---|---|---|---|---|
| Sky | 5 | 31 | 3.1 | 55 |
| Grass | 4.1 | 29 | 1.8 | 52 |
| Foliage | 1.2 | 35 | 9.5 | 65 |
| Water | 2.1 | 10 | 1.0 | 19 |
| Snow/Ice | 0.33 | 2.4 | 0.8 | 4.5 |

Table 5 (shown below) shows an example of a location-specific prior probability model for Key West in USA. Most notable changes from the location-unaware model include:
1. 75% of photos contain significant pieces of visible sky, and the likelihood is even higher at 95% for outdoor images, while the likelihood of seeing sky in an indoor image also increases from 3.1% to 10%;
2. Likelihoods for grass are similar;
3. Likelihoods for foliage decrease (more likely to see sky instead);
4. Likelihoods for open water significantly increase;
5. Likelihoods for snow decrease to nearly nonexistent.

TABLE 5

The probabilities of materials when location is known (Key West, USA)

| Material | % of all pixels | % of all images | % of indoor images | % of outdoor images |
|---|---|---|---|---|
| Sky | 20 | 75 | 10 | 95 |
| Grass | 5.0 | 30 | 2.0 | 50 |
| Foliage | 1.0 | 30 | 10 | 50 |
| Water | 15 | 30 | 1.0 | 80 |
| Snow/Ice | 0.01 | 0.01 | 0.0 | 0.01 |

Note that the location also has similar effect on the percentage of pixels for each material class within images.

In a variant embodiment of the present invention, additional information about the time can be useful when the environment changes during the course of a day or season at a given geographic location because certain materials such as grass, foliage, snow, ice, and water are sensitive to climate. For example, snow cover on a mountain may melt away during the summer at a vacation location, and by the same token foliage may only be seen in seasons other than winter there. Such information can be easily built into both the prior probability P(material|location, season-time) and the conditional probability P(spatial relationship|location, season-time) by modifying the probability values such as those shown in Tables 3 and 5 accordingly.

In this case, the image capture time and location information 363 are also provided to the data processor 20 for generating the belief map 124. This information helps immensely. For an intuitive example, consider again the region described in the preceding paragraph. If the location information 363 indicates that the digital image 102 was captured in Miami, Fla. and the image capture time indicates that the digital image 102 was captured at noon on Jun. 26, 2002, then the probability that the image contains any pixels or regions that represent the material of snow is extremely small. Alternatively, the image capture time can be used alone for generating the belief map 124 as both the prior probability P(material|season-time) and the conditional probability P(spatial relationship|season-time) can be derived and utilized in a similar fashion.

Figure 5:
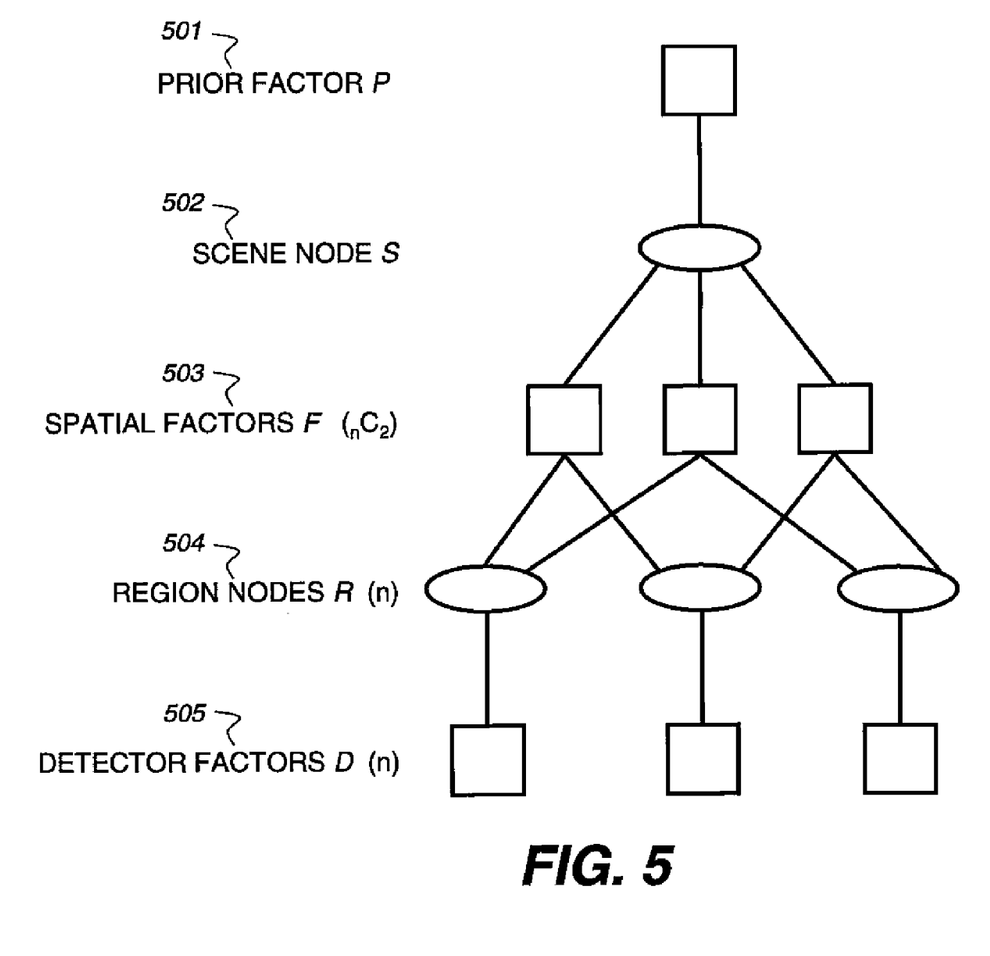
FIG. 5 is a graph representing a scene configuration model for integrating geographic location information.

Referring now to FIG. 5, where there is shown a graph representing a scene configuration model for integrating both the prior probabilities (P(material|location)) and conditional probabilities P (spatial arrangement of materials|location)) geographic location information. This graph is commonly referred to as a factor graph. The prior factor node P 501 employs the prior probability described above, the scene node S 502 incorporates scene context model, the spatial factor node F 503 consists of pair-wise relationships between individual regions. For each of the n regions in the image, there is a region node R 504. There are $_nC_2$ pairs between n regions so there are as many spatial factor nodes. The bottom level of the graph contains the detector factors D 505 and there are also n such nodes. The nodes of this graph model are first initialized with the prior probabilities and conditional probabilities, and then instantiated with material belief values from the materials detectors. A procedure called belief propagation is used to compute the posterior probability, i.e., final belief value, for each region combining all the inputs (also known as evidences, including the initial class probabilities, prior probabilities and conditional probabilities). In general, each region is labeled to the material class that gives the highest posterior probability. Details about how region classification is influenced by the probability mentioned above can be found in Singhal, Luo, and Zhu, *Probabilistic spatial context models for scene content understanding*, in Proceedings of Computer Vision and Pattern Recognition, pp. 235-241, 2003. Those skilled in the art will recognize that the present invention is not limited to the specific graph model described above.

Referring back to FIG. 2, in a variant embodiment of the present invention, additional information from the direction sensor 44 can be useful when the environment is far from isotropic at a given geographic location, e.g., one would see mostly sky and ocean if he faces east on the Miami beach while he would see buildings and trees when facing west. Such information can be easily built into both the prior probability P(material|location, direction) and the conditional probability P(spatial arrangement of materials|location, direction) by modifying the probability values such as those shown in Tables 3 and 5 accordingly.

The invention has been described in detail with particular reference to certain preferred embodiments thereof, but it will be understood that variations and modifications can be effected within the spirit and scope of the invention.

PARTS LIST

| | |
|---|---|
| 10 | image capture device |
| 15 | capture button |
| 20 | data processor |
| 22 | user input device |
| 30 | display device |
| 34 | image sensor |
| 36 | image processor |
| 40 | control computer |
| 44 | direction sensor |
| 60 | transform |
| 70 | memory device |
| 102 | digital image |
| 120 | improved digital image |
| 124 | material belief map |
| 325 | location determiner |
| 327 | geographic database |
| 329 | external location aware device |
| 350 | wireless modem |
| 362 | dock interface |
| 363 | location information |
| 364 | dock/recharger |
| 401 | color transform |
| 402 | computer texture features |
| 403 | neural network classifier |
| 404 | pixel belief map |
| 405 | region analysis |
| 406 | region belief map |
| 501 | prior factor |
| 502 | scene node |
| 503 | spatial factors |
| 504 | region nodes |
| 505 | detector factors |

The invention claimed is:

1. A method of classifying regions of image pixels in a digital image or video captured by an image capture device comprising:
   a) providing a geographic location determining device associated with the image capture device that provides an image capture GPS location associated with an image;
   b) using the location determining device to provide the image capture GPS location at substantially the time that the digital image or video was captured; and
   c) using a data processor for classifying regions of image pixels in the captured digital image or video into one or more material classes based on a spatial context model that indicates the likelihood that specific material classes occur or co-occur in images or videos captured at the particular image capture GPS location.

2. The method of claim 1, wherein the one or more material classes include sky, grass, water, clouds, pavement, snow, or walls.

3. The method of claim 1 wherein step (c) further includes:
   i) obtaining homogenous regions of image pixels from the captured digital image or a frame of the video;
   ii) extracting features from the homogeneous regions of image pixels; and
   iii) classifying the region of image pixels into one or more material classes, with associated class probabilities, based on the image capture GPS location and the extracted features.

4. The method of claim 3, wherein the extracted features include color or texture features associated with the region of image pixels.

5. The method of claim 1, wherein step (c) further includes using the image-capture time to classify regions of image pixels of the digital image.

6. The method of claim 3, wherein step (ii) further includes using the image-capture time to classify regions of image pixels of the digital image.

7. The method of claim 1, wherein step (c) further includes using the camera-facing direction to classify regions of image pixels of the digital image.

8. The method of claim 3, wherein step (ii) further includes using the camera-facing direction to classify regions of image pixels of the digital image.

9. The method of claim 3 wherein step (iii) includes associating prior probabilities of material classes according to geographic location and using such prior probabilities to determine the class of a region of image pixels.

10. The method of claim 3 wherein step (iii) includes associating conditional probabilities between material classes according to geographic location and using such conditional probabilities to determine the respective material class of each region of image pixels.

11. The method of claim 10 wherein the conditional probabilities between material classes are specified as pair-wise probabilities according to one or more of spatial relationships including above, far above, below, far below, beside, enclosed, or enclosing.

12. The method of claim 3 wherein step
    (iii) further includes
    (i) producing initial material class probabilities based only on the extracted features;
    (ii) using a graphical model to modify the initial material class probabilities to produce posterior material class probabilities in response to the prior probabilities and the conditional probabilities between material classes according to geographic location.

13. The method of claim 3 further includes labeling a region of image pixels as the material class with highest posterior material class probability.

14. A method of enhancing regions of image pixels in a digital image or a video frame captured by an image capture device comprising:
    a) providing a geographic location determining device associated with the image capture device that provides an image capture GPS location associated with an image;
    b) using the geographic location determining device to provide the image capture GPS location at substantially the time that the digital image or video was captured;
    c) using a data processor for classifying regions of image pixels in the captured digital image or video into one or more classes based on a spatial context model that indicates the likelihood that specific classes occur or co-occur in images or videos captured at the particular image capture GPS location; and
    d) applying image enhancement to classified regions of image pixels depending on the class of each region.

15. A method of searching in a database a digital image or a video frame captured by an image capture device comprising:

a) providing a geographic location determining device associated with the image capture device that provides an image capture GPS location associated with an image;
b) using the geographic location determining device to provide the image capture GPS location at substantially the time that the digital image or video was captured;
c) using a data processor for classifying regions of image pixels in the captured digital image or video into one or more classes based on a spatial context model that indicates the likelihood that specific classes occur or co-occur in images or videos captured at the particular image capture GPS location, storing the classified regions of image pixels in a database; and
d) searching in the database for images containing regions of image pixels of one or more pre-determined classes.

16. A method of classifying regions of image pixels in a digital image or video captured by an image capture device comprising:

a) providing a geographic location determining device associated with the image capture device that provides an image capture GPS location associated with an image;
b) using the location determining device to provide the image capture GPS location at substantially the time that the digital image or video was captured;
c) providing a time determining device associated with the image capture device;
d) using the time determining device to measure the image capture time at substantially the time that the digital image or video was captured; and
e) using a data processor for classifying regions of image pixels in the captured digital image or video into one or more classes based on a spatial context model that indicates the likelihood that specific classes occur or co-occur in images or videos captured at the particular image capture GPS location and the image capture time.

* * * * *